US006057865A

United States Patent [19]

Hawkins

[11] Patent Number: 6,057,865

[45] Date of Patent: May 2, 2000

[54] TRANSFERRING OF COLOR SEGMENTS TO A RECEIVER

[75] Inventor: Gilbert A. Hawkins, Mendon, N.Y.

[73] Assignee: Eastman Kodak Company, Rochester, N.Y.

[21] Appl. No.: 08/935,402

[22] Filed: Sep. 23, 1997

[51] Int. Cl.[7] .......... G01D 9/00

[52] U.S. Cl. .......... 346/140.1; 347/43

[58] Field of Search .......... 346/140.1, 146, 346/46; 347/43

[56] References Cited

U.S. PATENT DOCUMENTS 4,675,694 6/1987 Bupara .......... 346/140.1
5,745,128 4/1998 Lam et al. .......... 346/140.1
5,771,810 6/1998 Wolcott .......... 346/140.1

*Primary Examiner*—N. Le
*Assistant Examiner*—Lamson D. Nguyen
*Attorney, Agent, or Firm*—Raymond L. Owens

[57] ABSTRACT

A colorant transfer printhead for viewing or delivering color segments to a receiver, including a plurality of color channels, a structure for delivering the color segments to each of the color channels; and a structure for moving a top element disposed over the color channels from a blocked position to an unblocked position to control the transfer of the color segments and for moving the receiver into contact with the color channels for transfering the color segments onto the receiver.

12 Claims, 15 Drawing Sheets

TRANSFERRING OF COLOR SEGMENTS TO A RECEIVER

CROSS REFERENCE TO RELATED APPLICATIONS

Reference is made to commonly assigned U.S. patent application Ser. No. 08/882,620 filed Jun. 25, 1997, entitled "Continuous Tone Microfluidic Display and Printing" by Dana Wolcott; U.S. patent application Ser. No. 08/936,075, filed Sep. 23, 1997, entitled "Transferring of Color Segments" by Gilbert A. Hawkins and U.S. patent application Ser. No. 08/935,574, filed Sep. 23, 1997, herewith, entitled "Applying Energy in the Transfer of Ink from Ink Color Segments to a Receiver" by Gilbert A. Hawkins, the teachings of which are incorporated herein.

FIELD OF THE INVENTION

The present invention relates to liquid ink printing of continuous tone color images by microfluidic printhead arrays.

BACKGROUND OF THE INVENTION

Inkjet printing is a preferred technology for printing color images. Both continuous inkjet and drop on demand inkjet methods are commonly practiced. In commercial inkjet printers of both types, drops of ink expelled from a printhead traverse a short distance in air to a receiver on which they land, thereby producing a visible image on the receiver. Continuous inkjet printing methods rely on directional control of a stream of continuously produced droplets, while drop on demand methods rely on thermal drop expulsion (as embodied by products from Hewlett Packard Co. and Canon Corp., for example) and on piezo drop expulsion (as embodied by products from Epson Corp., for example). Such inkjet printers suffer from certain drawbacks, for example the difficulty of positioning drops accurately and inexpensively on the receiver. Also, there is generally a need to precisely move or scan the printhead with respect to the receiver on which the droplets land. Mechanical mechanisms to accomplish this motion are costly, require substantial power to operate, and take up space; considerations particularly important for the low cost portable printers. The principally know means of providing continuous tone color reproduction, namely the deposition of multiple drops onto a single image pixel, suffers from an uncertainty in the exact location of the printed pixels because the receiver is typically moving during printing and multiple drops cannot be released simultaneously.

Inkjet printers as currently practiced also suffer from a difficulty of inexpensively achieving continuous tone (grayscale) color reproduction. Such grayscale color reproduction is well known in the art of color printing to be advantageous in producing high quality images. Although some printers control the volume of drops, only drops of a particular color are deposited on the receiver at any one time, and the resulting tone scale is not ideal, because in the case of deposition of two or more ink colors, the first color has dried or been absorbed by the receiver appreciably before drops of the second color are deposited. Also, such methods of continuous tone color reproduction suffer image artifacts because the less dense image pixels, corresponding to smaller volumes of ink, do not occupy the same area on the receiver as the higher density image pixels, corresponding to larger volumes of ink. Failure to print pixels of equal area regardless of image density is known to produce visual artifacts in printed images.

Some solutions to these problems have been proposed in commonly assigned U.S. patent application Ser. No. 08/882,620, filed Jun. 25, 1997 in which ink is deposited on a receiver without the need for the drops to traverse a distance in air to the receiver. According to the contact printhead array disclosed, a substrate is provided with a multiplicity of ink channels and ink in each ink channel is pumped by a corresponding multiplicity of pumps directly to a receiver in contact with the openings of the ink channels at the substrate top surface. Such a contact printhead array comprises a two dimensional array of such ink channels and pumps in order to print all image pixels without the necessity of movement of the receiver with respect to the printhead. Also disclosed are chambers for mixing of inks of different colors prior to deposition of the mixed inks on a receiver, aimed at improving color image quality.

Microfluidic pumping and dispensing of liquid chemical reagents is the subject of three U.S. Pat. Nos. 5,585,069, 5,593,838, and 5,603,351. The system uses an array of micron sized reservoirs, with connecting microchannels and reaction cells etched into a substrate. Electrokinetic pumps comprising electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array may be decoupled from the assembly and removed for incubation or analysis. When used as a printing device, the chemical reagent solutions are replaced by dispersions of cyan, magenta, and yellow pigment, and the array of reaction cells may be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print, or photograph, of the original scene. One problem with this kind of printer is the rendering of an accurate tone scale. The problem comes about because the capillary force of the paper fibers remove all the pigment solution from the cell, draining it empty. If, for example, a yellow pixel is being printed, the density of the image will be fully yellow. However, in some scenes, a light, or pale yellow is the original scene color. One way to solve this problem might be to stock and pump a number of yellow pigments ranging from very light to dark yellow. Another way to solve the tone scale problem is to print a very small dot of dark yellow and leave white paper surrounding the dot. The human eye will integrate the white and the small dot of dark yellow leading to an impression of light yellow, provided the dot is small enough. This is the principle upon which the art of color halftone lithographic printing rests. It is sometimes referred to as area modulation of tone scale. However, in order to provide a full tone scale of colors, a high resolution printer is required, with many more dots per inch than would be required if the colors could be printed at different densities. Another solution to the tone scale problem has been provided in the area of ink jet printers, as described in U.S. Pat. No. 5,606,351, by Gilbert A. Hawkins, hereby incorporated by reference. In an ink jet printer, the drop size is determined primarily by the surface tension of the ink and the size of the orifice from which the drop is ejected. The ink jet printer thus has a similar problem with rendition of tone scale. The Hawkins patent overcomes the problem by premixing the colored ink with a colorless ink in the correct proportions to produce a drop of ink of the correct intensity to render tone scale. However, ink jet printers require a relatively high level of power to function, and they tend to be slow since only a few pixels are printed at a time (serial printing), in comparison to the microfluidic printer in which all the pixels are printed simultaneously (parallel printing). Also, displays for viewing the image before printing, i.e. LCDs, CRTs, require cost and power that make incorporating them in a portable device impractical.

Such contact printhead arrays are however difficult to fabricate inexpensively due to the size and complexity of the ink channels, pumps, and mixing chambers, particularly for the printing of high quality images with closely spaced pixels, for examples pixels spaced more closely than about 100 microns. As is well known in the art, there is a need for more closely spaced pixels. High quality images are typically printed in the range of from 300 to 2400 dots per inch, the commonly used measure of the density of image pixels, corresponding to pixel spacings of from 80 to 10 microns. Also, the degree of mixing of fluids in mixing chambers is subject to variations due to the time of residence of fluids in the chambers, the order and timing of the combination of the fluids, as is well know in the art of microfluidic mixing, and is disadvantageous for the consistent reproduction of color hue and saturation.

SUMMARY OF THE INVENTION

It is an object of the present invention to form an array of color segments and to effectively transfer such color segments to a receiver.

It is a still further object of the present invention to provide a method and apparatus which solves the prior art problems associated with color inkjet printing. In particular it is the object to provide a simple and inexpensive way of printing high quality color images using low power.

These objects are achieved in a colorant transfer printhead for viewing or delivering color segments to a receiver, comprising:

(a) a plurality of color channels, (b) means for delivering color segments to the color channels; and (c) means for transferring the delivered color segments in the color channels to the receiver.

A feature of the present invention is that color segments which can vary in intensity and hue are formed of colorants such as ink that can be readily viewed or transferred to a receiver. Another feature of the present invention is that it provides a means for transferring color segments to a receiver Another feature of the present invention is that it provides a means for transferring color segments to a receiver without requiring a two-dimensional array of microfluidic pumps.

It is advantageous that color segments may be printed onto a receiver in a manner providing continuous tone color images.

DETAILED DESCRIPTION OF THE PREFERRED EMBODIMENTS

Figure 1A:
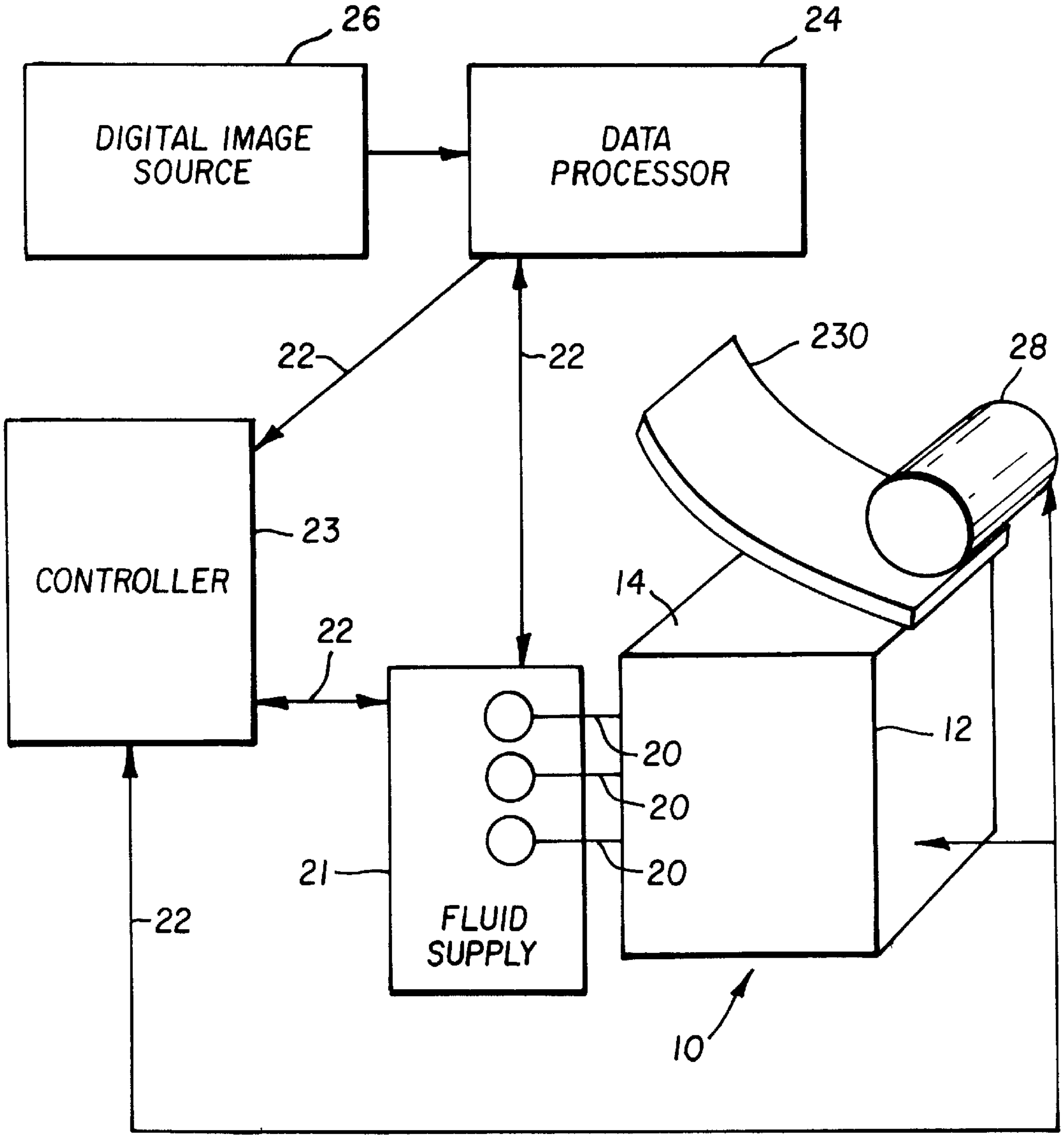
FIG. 1*a* is a block diagram showing apparatus which includes a colorant transfer printhead in accordance with the present invention.

FIG. 1*a* shows a system for displaying and printing images using a colorant transfer printhead 10 connected by fluid supply channels 20 to a fluid supply 21 and connected electrically by electrical interconnects 22 to a controller 23. Controller 23 and fluid supply 21 are connected electrically, by additional electrical interconnects 22, to a data processor 24 which is connected electrically to a digital image source 26. Colorant transfer printhead 10 to be described, comprises a substrate 12 and a substrate top surface 14, and functions to provide a viewable image and/or a printable image on substrate top surface 14 by means to be described of manipulating inks and other fluids to positions on substrate top surface 14 using information provided by controller 23. Controller 23 is connected electrically to a receiver positioning device 28 which can mechanically position a receiver 230 directly above or in contact with colorant transfer printhead 10. In accordance with the method of operation of the present invention, digital data from digital image source 26, for example a computer, a digital camera, or a disk drive, is transferred to data processor 24 which formats the digital data in a manner which permits color hue and intensity to be produced by colorant transfer printhead 10 to be described. For example, data processor 24 may calculate the required time of operation of parts internal to colorant transfer printhead 10 such as pumps, to be described, so that accurate color hue and intensity can be produced for viewing or for printing. To accomplish such calculations, data processor 24 may use information provided by fluid supply 21, for example information of the colors and densities of inks in fluid supply 21, and receives such information through electrical interconnects 22. The double headed arrows on electrical interconnects 22 in FIG. 1*a* indicate that data can flow in either direction, while a single arrow indicates date flow is primarily in a single direction. Controller 23 converts formatted data from data processor 24 into electrical signals that control the operation of colorant transfer printhead 10, to be described, and receiver positioning device 28, which positions receiver 230 directly above or on colorant transfer printhead 10 when printing is desired or positions receiver 230 away from colorant transfer printhead 10 when it is desired to view colorant transfer printhead 10. In a preferred method of operation, colorant transfer printhead 10 provides color segments which form a viewable image corresponding to the image provided by digital image source 26. In another preferred method of operation, colorant transfer printhead 10 provides an image corresponding to the image provided by digital image source 26 which can be printed. In another preferred method of operation, colorant transfer printhead 10 provides color segments corresponding to the image provided by digital image source 26 which can be first viewed and then printed.

Figure 1B:
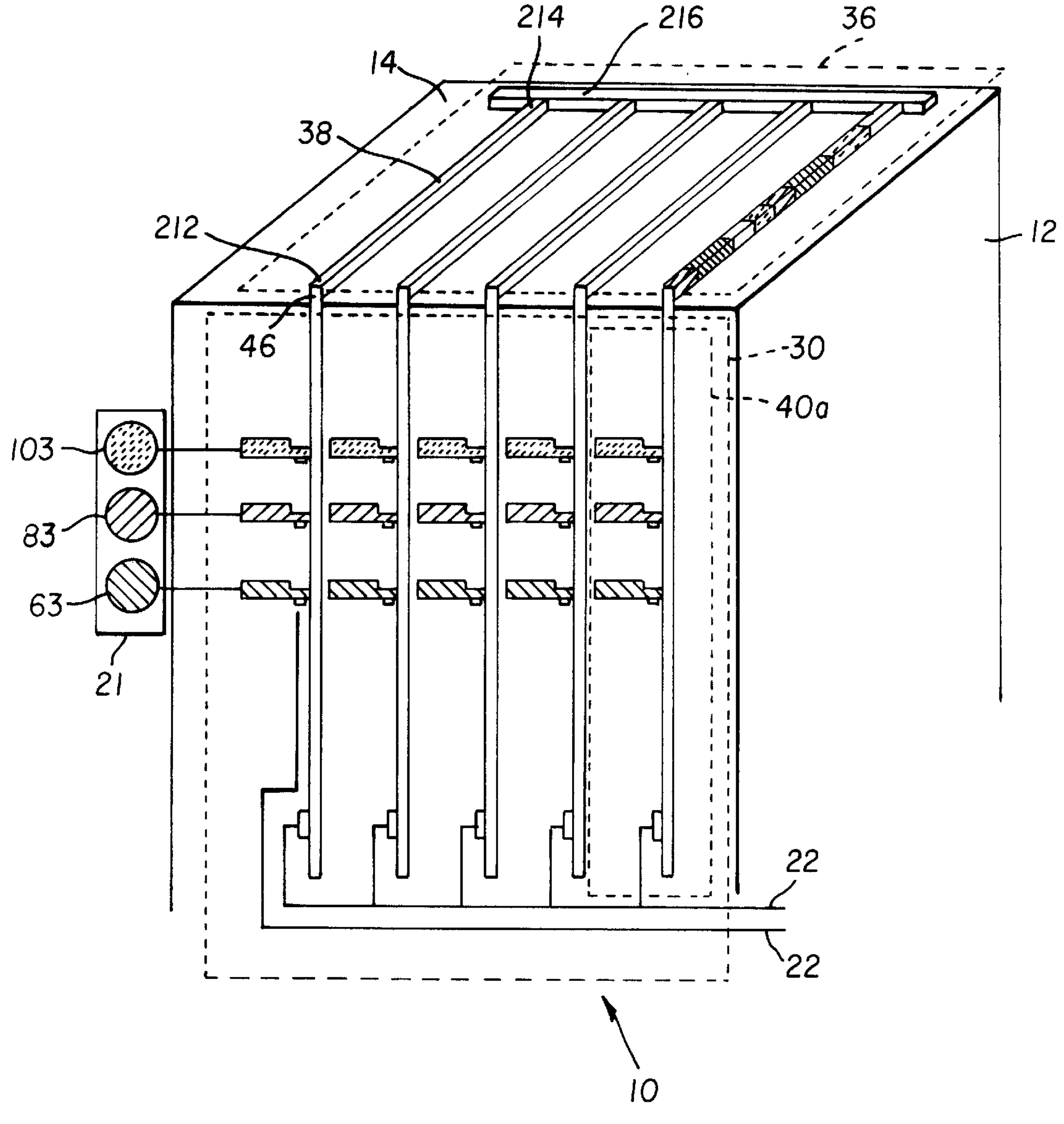
FIG. 1*b* is a schematic perspective of a preferred colorant transfer printhead of FIG. 1*a;*

In accordance with the present invention, colorant transfer printhead 10, shown in FIG. 1*b*, is comprised of a color segment assembly array 30, located along one side of substrate 12, and a color channel array 36, located on substrate top surface 14. As will be described, substrate 12 comprises a plurality of layers whose geometry and composition differ and which contain elements essential to the operation of colorant transfer printhead 10. Likewise, color channel array 36 comprises a plurality of layers to be described whose geometry and composition differ in ways essential to the operation of colorant transfer printhead 10. The construction and operation of color segment assembly array 30 is first described, because in printing images, the color segment assembly array 30 performs functions prior to those performed by color channel array 36, including delivering color segments to color channel array 36.

Figure 1C:
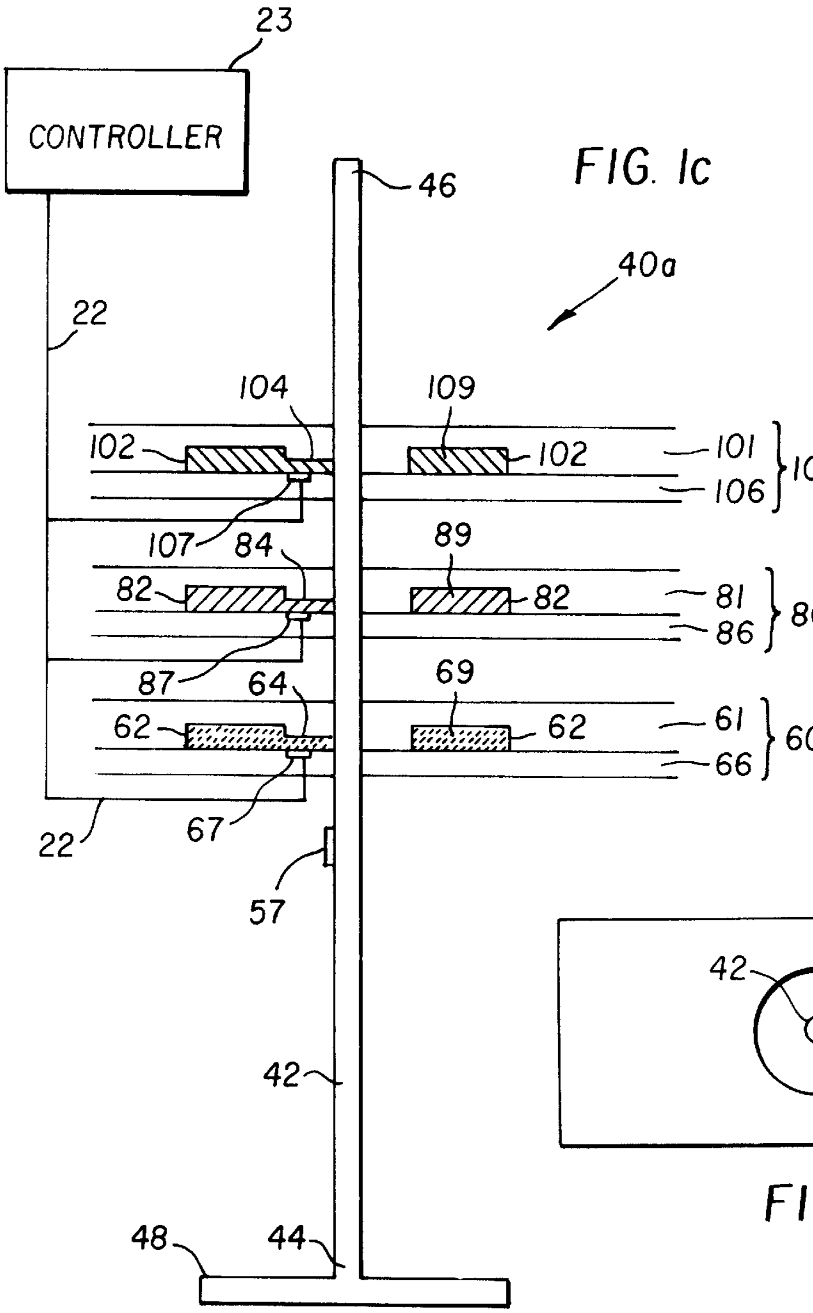
FIG. 1*c* is a schematic perspective of a simplified color segment assembly unit shown in FIG. 1*b;*

As shown in FIG. 1*b*, the color segment assembly array 30 comprises a plurality of simplified color segment assembly units 40*a* aligned side by side, in the preferred embodiment, so that a linear array of simplified color segment assembly units 40*a* is provided near the side of substrate 12. As shown in FIG. 1*c*, each simplified color assembly unit 40*a* is constructed by forming an assembly channel 42 by drilling or etching through substrate 12. Typically, the cross-section of assembly channel 42 is circular, with a diameter in the range of from 5 to 100 microns. Preferably, substrate 12 is silicon or is a silicon oxide glass so that the drilling can be accomplished by the steps of photolithographic masking and reactive ion etching, as is well known in the art of integrated circuit processing. Assembly channel 42 has an assembly channel top 46 and an assembly channel bottom 44. Assembly channel top 46 is connected to portions of color channel array 36 (FIG. 1*b*), and assembly channel bottom 44 is connected to a carrier fluid reservoir 48 which provides a source of a carrier fluid 59, preferably a clear fluid, to assembly channel 42, the means of connection being similar to that described presently for connecting assembly channel 42 to sources of colored inks.

Sources of colored inks inject inks of predetermined colors into assembly channel 42. A typical first color source layer 60 is made of two layers, shown as horizontal layers in FIG. 1*c*, specifically a first color reservoir layer 61 and a first color capping layer 66, which layers are bonded, for example by an epoxy bond, after each has been processed to have internal structure essential to operation of the present invention.

Figure 2A:
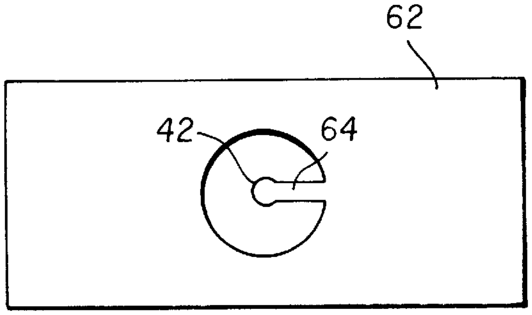
FIG. 2*a* and FIG. 2*b* are respectively top and side views of one color source layer shown in FIG. 1*c;*
Figure 2B:
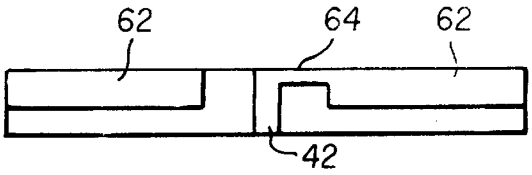

First color reservoir layer 61 is shown in top-view FIG. 2*a* and in cross-section in FIG. 2*b*. The essential features of first color reservoir layer 61 are a first color reservoir 62 which is provided by etching a depression into first color reservoir layer 61 to a predetermined depth and a first color metering region 64 provided by similarly etching a depression into first color reservoir layer 61 but to a lesser depth. First color reservoir layer 61 and first color metering region 64 are typically filled with first color ink 69, so that first color ink 69 can be pumped into assembly channel 42 when desired by a first color pump 67 when the pump is activated by a signal from controller 23. Also shown schematically in FIG. 1*b*, the first color reservoir 62 is connected to a first color external supply 63 to replenish first color ink 69 when it is pumped into assembly channel 42. As shown in FIGS. 1*c*–2*b*, a portion of the assembly channel 42 extends through the first color reservoir layer 61.

The first color capping layer 66, shown in FIG. 1*c*, is attached, for example by epoxy cement, to the bottom of first color reservoir layer 61, thereby serving to form one side of the first color reservoir 62. The first color capping layer 66 in addition contains first color pump which can be activated by controller 23 through electrical interconnects 22 when it is desired to pump first color ink 69 into assembly channel 42. The design of first color pump 67 is such that fluid is substantially prevented from flowing in either direction unless first color pump 67 is activated. Microfluidic pumps are well known in the art and can be fabricated by micromachining techniques using equipment and processes commonly employed in the manufacture of integrated circuits. For example, fabrication of electrohydrodynamic pumps is reported by A. Richter, A. Plettner, K. A. Hofmann and H. Sandmaier in Sensors and Actuators A, 29 (1991) pp 159–168, and fabrication of electroosmotic pumps is described by P. K. Dasgupta and Shaorong Liu in Ana. Chem. 1994, 66, pp 1792–1798, whose teaching are incorporated by reference herein. Such pumps are activated by application of voltages across electrodes. They may be localized to extend over only a very small region of the channel carrying the fluid to be pumped or they may be configured to occupy a larger portion or all of the channel or channels carrying the fluid to be pumped. Other types of pumps, for example piezoelectric pumps, are also well known in the art and can be used to pump fluids in accordance with this invention. It is to be understood that although the schematic representation of microfluidic pumps shown in FIG. 1*b* through FIG. 4*h* and discussed in the entirety of the present document shows the pumps occupying only a small portion of the channels along which fluids are to be pumped, in all cases it is within the scope and spirit of this invention that the pumps can be of the types which occupy any or all of the channels along which fluids are pumped. A portion of assembly channel 42 extends through the first color capping layer 66, as shown in FIG. 1*c*, so that a portion of assembly channel 42 passes through the entire first color source layer 60.

As will be described, the first color source layer provides a means of injecting first color ink 69 into assembly channel 42 at a location above first color metering region 64. In a similar manner and with similar numbering and naming conventions, a second color source layer 80 and a third color source layer 100 are located above first color source layer 60. Thereby a means is provided by which a predetermined pattern of color ink segments 211 can be produced in assembly channel 42, as will be described presently.

Second color source layer 80 comprises a second color reservoir layer 81 and a second color capping layer 86 bonded together. Second color reservoir layer 81 contains a second color reservoir 82 which is provided by etching a depression into second color reservoir layer 81 to a predetermined depth and a second color metering region 84 provided by similarly etching a depression into second color reservoir layer 81 but to a lesser depth. Second color reservoir layer 81 and second color metering region 84 are typically filled with second color ink 89, so that second color ink 89 can be pumped into assembly channel 42 when desired by a second color pump 87 when the pump is activated. Second color reservoir layer 80 is connected to a second color external supply 83 to replenish second color ink 89 when it is pumped into assembly channel 42. As shown in FIGS. 1*c*–2*a*, a portion of the assembly channel 42 extends through the second color reservoir layer 81.

Second color capping layer 86, shown in FIG. 2, is attached to the bottom of second color reservoir layer 81, thereby serving to form one side of the second color reservoir 82. The second color capping layer 86 in addition contains a second color pump 87 pump which can be activated by controller 23 through electrical interconnects 22 when it is desired to pump second color ink 89 into assembly channel 42 The design of second color pump 87 is such that fluid is substantially prevented from flowing in either direction unless second color pump 87 is activated. A portion of assembly channel 42 extends through the second color capping layer 86, as shown in FIG. 1*c,* so that a portion of assembly channel 42 passes through the entire second color source layer 80.

Third color source layer 100 comprises a third color reservoir layer 101 and a third color capping layer 106 bonded together. Third color reservoir layer 101 contains a third color reservoir 102 which is provided by etching a depression into third color reservoir layer 101 to a predetermined depth and a third color metering region 104 provided by similarly etching a depression into third color reservoir layer 101 but to a lesser depth. Third color reservoir layer 101 and third color metering region 104 are typically filled with third color ink 109, so that third color ink 109 can be pumped into assembly channel 42 when desired by a third color pump 107. Third color reservoir layer 100 is connected to a third color external supply 103 to replenish third color ink 109 when it is pumped into assembly channel 42. As shown in FIGS. 1*b*–2*b*, a portion of the assembly channel 42 extends through the third color reservoir layer 101.

Third color capping layer 106, shown in FIG. 2, is attached to the bottom of third color reservoir layer 101, thereby serving to form one side of the third color reservoir 102. The third color capping layer 106 in addition contains a third color pump 107 and pump which can be activated by controller 23 through electrical interconnects 22 when it is desired to pump third color ink 109 into assembly channel 42 The design of third color pump 107 is such that fluid is substantially prevented from flowing in either direction unless third color pump 107 is activated. A portion of assembly channel 42 extends through the third color capping layer 106, as shown in FIG. 1*c,* so that a portion of assembly channel 42 passes through the entire third color source layer 100.

As shown in FIG. 1*b,* color channel array 36 is preferably located on substrate top surface 14 and having a plurality of color channels 38, preferably rectangular, formed by etching substrate top surface 14, preferably by a reactive ion etch, each color channel having a fluid input end 212 connected to assembly channel top 46 of an associated simplified color assembly unit 40*a* and a fluid overflow end 214 connected to a single overflow channel 216, in order that fluid pumped vertically along assembly channels 42 of color segment assembly array 30 flow horizontally along the associated color channels 38. Fluids so pumped include first color ink 69, second color ink 89, third color ink 109, and carrier fluid 57, and comprise a plurality of ink segments 211.

Figure 3:
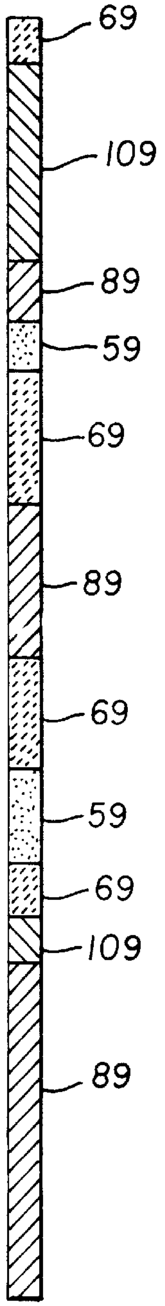
FIG. 3 shows a desired color segment pattern which corresponds to the steps shown in FIG. 4*a*–FIG. 4*h;*
Figure 4A:
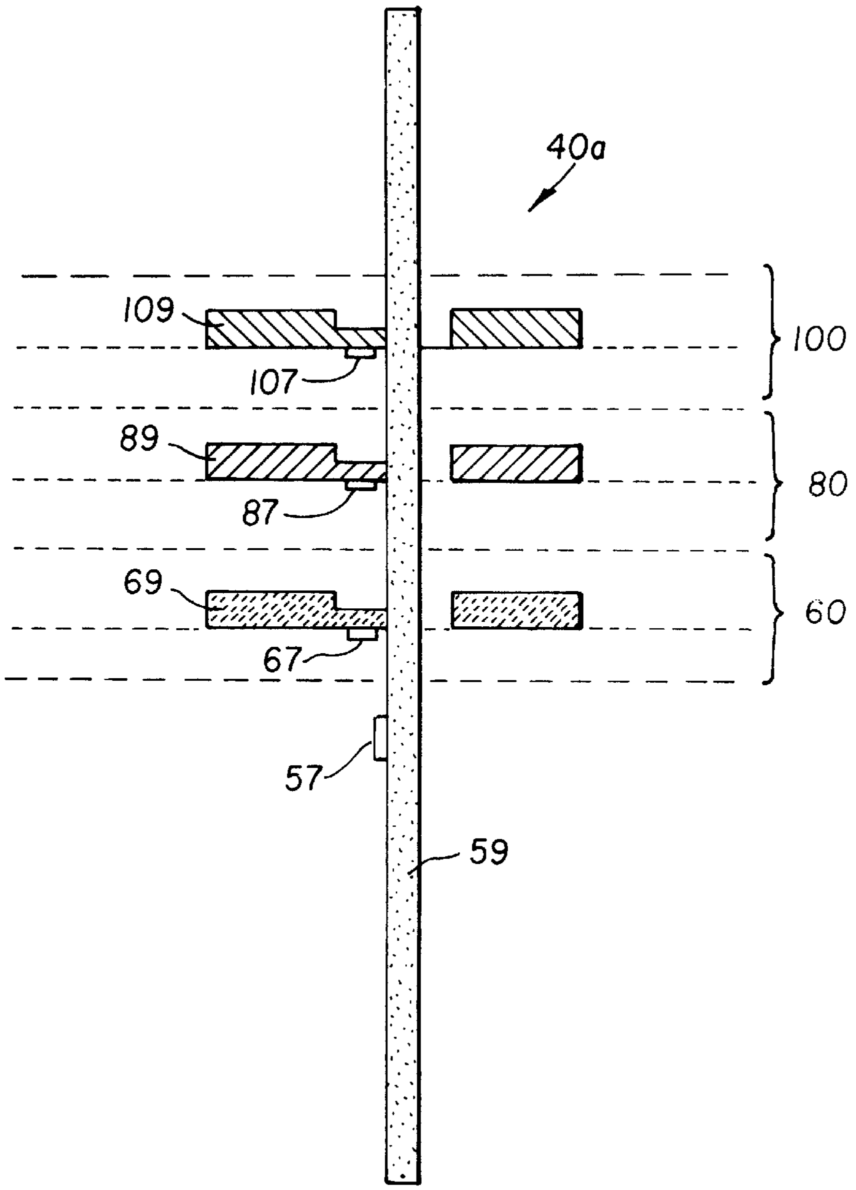
FIG. 4*a*–FIG. 4*h* show various steps in the process of forming a plurality of color segments in a simplified color segment assembly unit.
Figure 4B:
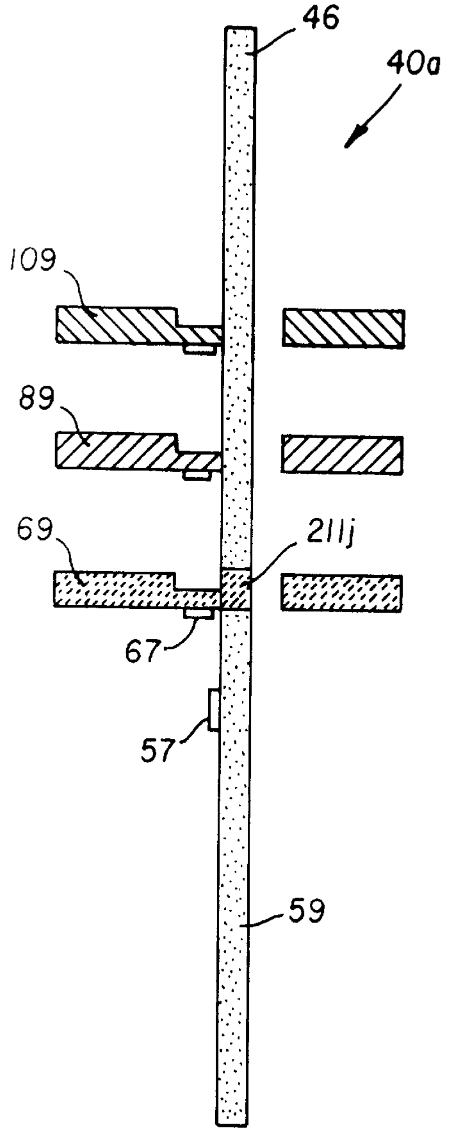
Figure 4C:
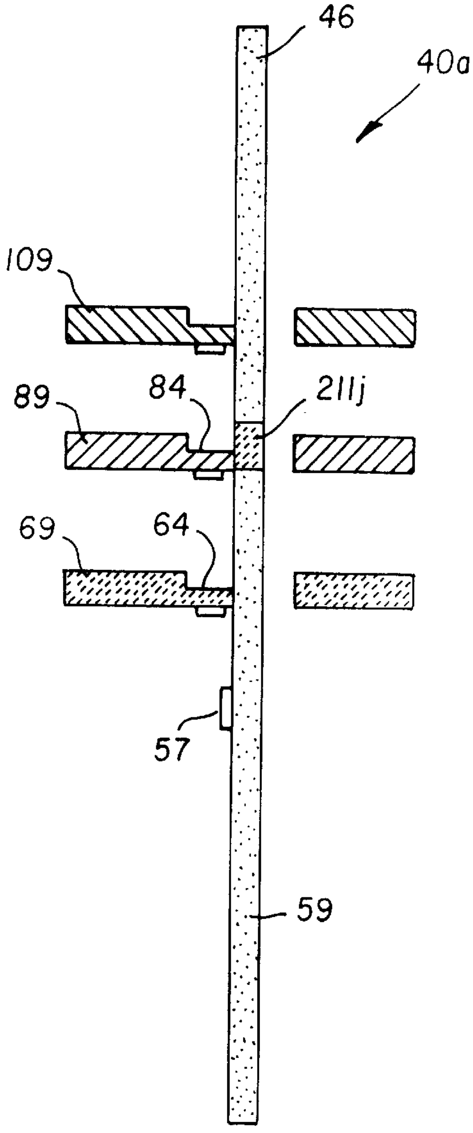
Figure 4D:
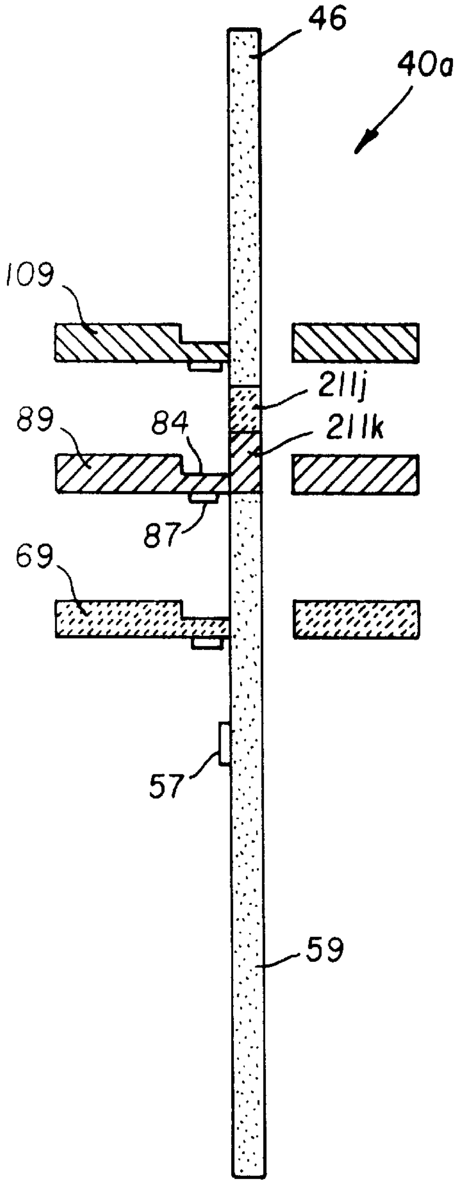
Figure 4E:
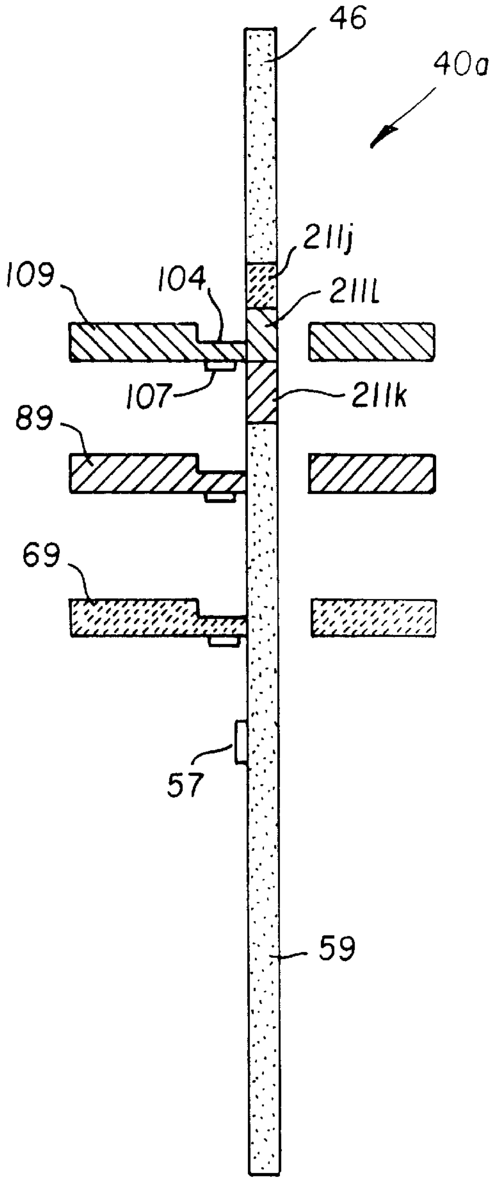
Figure 4F:
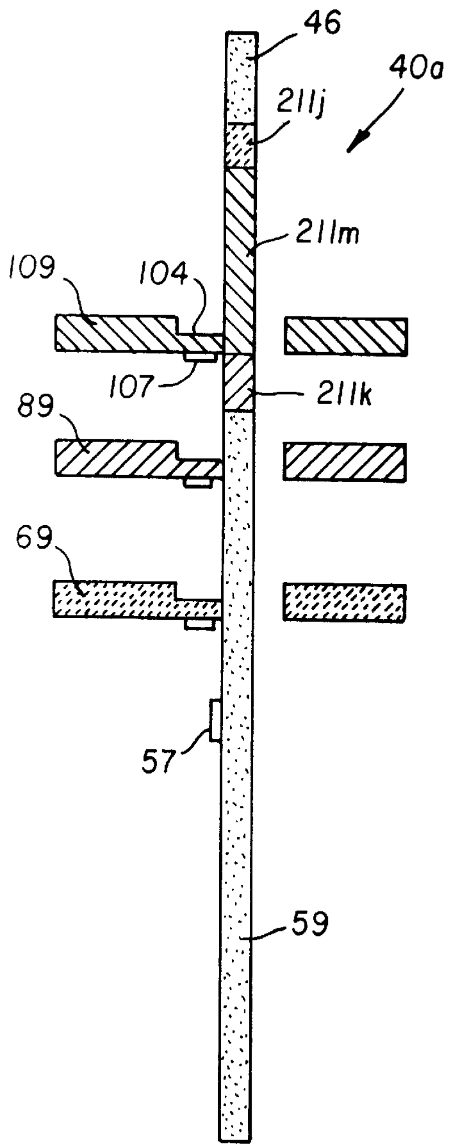
Figure 4G:
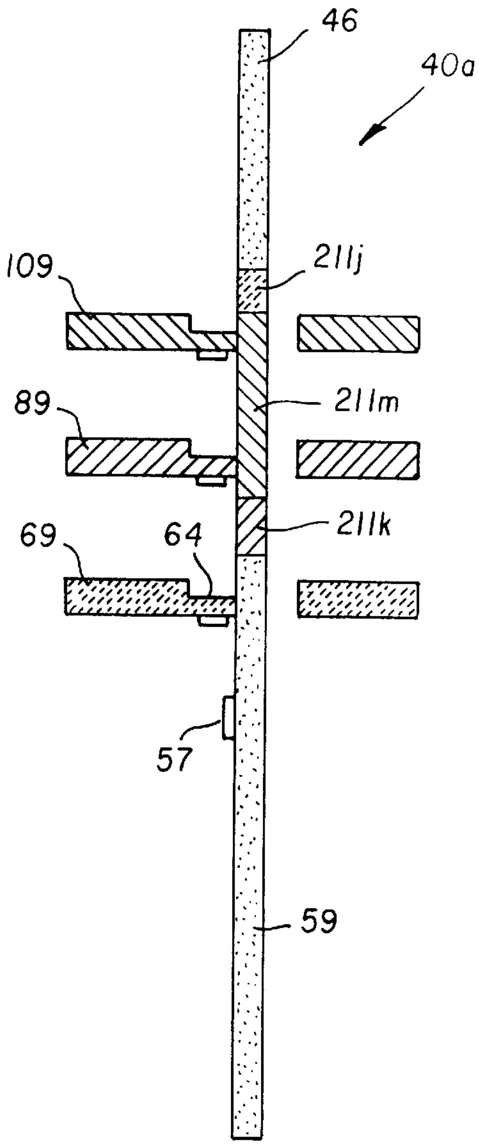
Figure 4H:
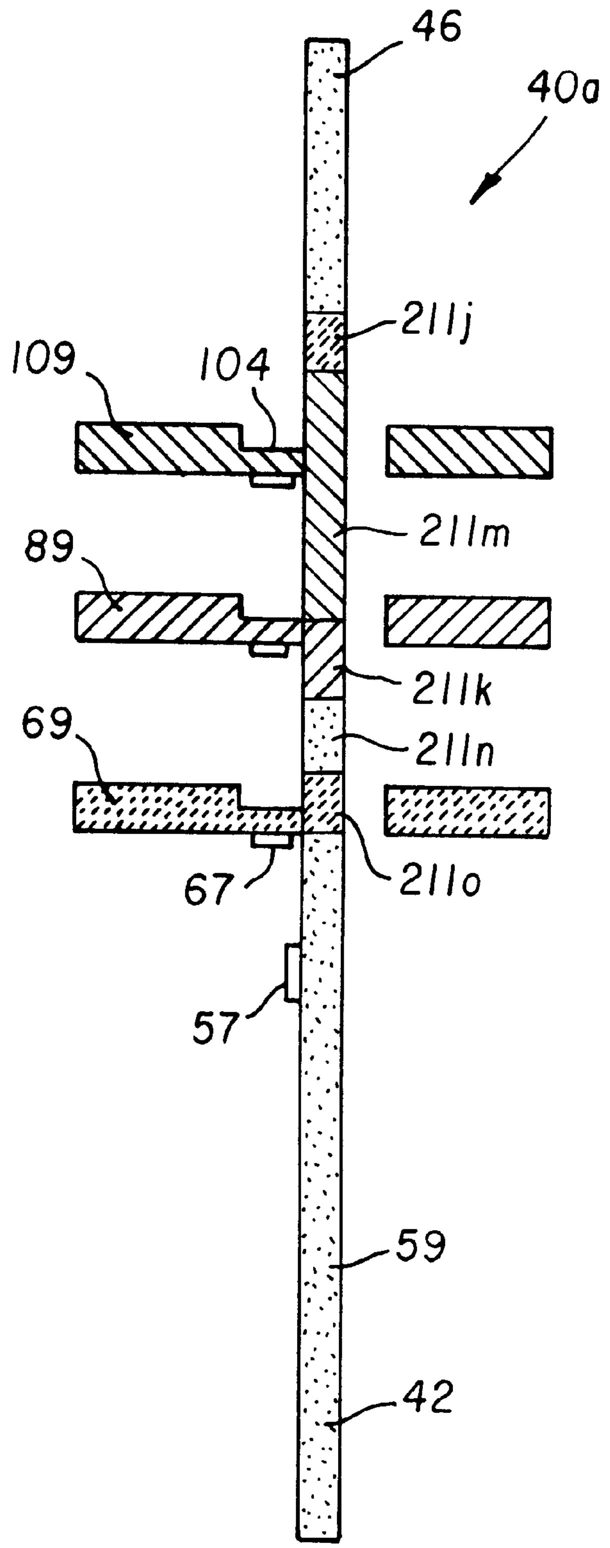

FIGS. 3 through FIG. 4*h* display a preferred embodiment of simplified color assembly unit 40*a* and serve to describe the operation of color segment assembly array 30 and of the method by which ink segments 211 are provided by color segment assembly array 30. FIG. 3 represents schematically a pattern of predetermined color segments 211 which is a desired color pattern to be assembled by process operations described below by simplified color assembly unit 40*a*. The colors shown (top to bottom) in desired color pattern 205 include the colors of first color ink 69, third color ink 109, second color ink 89, and the color of carrier fluid 59 which is preferably colorless.

FIG. 4*a* shows a cross-section of simplified color assembly unit 40*a* with assembly channel 42 filled with carrier fluid 59, carrier fluid pump 57, first color source layer 60 filled with first color ink 69, first color pump 67, second color source layer 80 filled with second color ink 89, second color pump 87, third color source layer 100 filled with first color ink 109, and third color pump 107. Predetermined color segments 211 shown in FIG. 3 as desired color pattern 205 are to be assembled in assembly channel 42 using process operations described below, by simplified color assembly unit 40*a*. The colors shown (top to bottom) in desired color pattern 205 include the colors of first color ink 69, second color ink 89, third color ink 109, and the color of carrier fluid 59 which is preferably colorless. FIG. 4*a* corresponds to the beginning of the color segment assembly process.

FIG. 4*b* shows the simplified color assembly unit 40*a* after the first step in the assembly of desired color pattern 205. First color segment 211*j* has been pumped into assembly channel 42 by activating first color pump 67. Carrier fluid in the assembly channel top 46 has been pumped upwards in this step. As described later, any fluid flowing out of assembly channel top 46 will flow into color channels 38 connected to assembly channel top 46 (FIG. 1*c*). The length of first color segment 211*j* is controlled by the pump flow rate and the time during which the pump is on so as to be the a predetermined length, namely the length of the color segment shown topmost in desired color pattern 205. This time may be computed by data processor 24 using data from digital imaging source 26 and knowledge of the pump rate of first color pump 67 and the amount of ink in the corresponding color segment of the desired color pattern 205, or the time may be taken from a look up table stored in data processor 24.

FIG. 4*c* depicts the position of first color segment 211*j* after carrier fluid pump 57 has been activated for a time sufficient to move the bottom of first color segment 211*j* into alignment with second color metering region 84. This time may be computed by data processor 24 from a knowledge of the pump rate of carrier fluid pump 57 and the distance between second color metering region 84 and first color metering region 64 or may be taken from a look up table stored in data processor 24 which receives information about colorant transfer printhead 10 through electrical interconnects 22.

FIG. 4*d* depicts the position of first color segment 211*j* and second color segment 211*k* after second ink pump 87 has been for a time sufficient to provide a length of second color segment 211*k* equal to the length of the third-from-top color shown in desired color pattern 205 (FIG. 3). This time may be computed from a knowledge of the pump rate of second ink pump 87 and amount of ink in the corresponding color segment of the desired color pattern 205 or the time may be taken from a look up table.

FIG. 4*e* depicts the position of first color segment 211*j*, second color segment 211*k*, and partial third color segment 211*l* after carrier fluid pump 57 has been activated for a time sufficient to move the bottom of first color segment 211*j* into alignment with third color metering region 104 and also after second ink pump 87 has been activated for a time sufficient to provide a length of second color segment 21*k* smaller than the length of the second-from-top color shown in desired color pattern 205 (FIG. 3). In effect, partial third color segment 211*l* has been inserted between first color segment 211*j* and second color segment 211*k*.

FIG. 4*f* depicts the position of first color segment 211*j*, second color segment 211*k*, and third color segment 211*m* after second ink pump 87 has continued to be activated for a time sufficient to provide a length of partial third color segment 211*l* equal to the length of the second-from-top color shown in desired color pattern 205 (FIG. 3). This time may be computed by data processor 24 from a knowledge of the pump rate of third ink pump 107 and of the amount of ink in the corresponding color segment of the desired color pattern 205, or the time may be taken from a look up table. In effect, third color segment 211*m* has been inserted between first color segment 211*j* and second color segment 211*k* by the steps depicted in FIGS. 4*e* and 4*f*.

FIG. 4*g* depicts the position of first color segment 211*j*, second color segment 211*k*, third color segment 211*l* after carrier fluid pump 57 has been activated to pump carrier fluid downward in assembly channel 42 for a time sufficient to move the bottom of third color segment 211*m* a distance equal to the length of the corresponding carrier fluid portion (fourth from top in FIG. 3) of desired color pattern 205 above first color metering region 64.

FIG. 4*h* depicts the position of first color segment 211*j*, second color segment 211*k*, and third color segment 211*m*, carrier fluid segment 211*n*, and first color segment 211*o* after first color pump 67 has been activated for a time sufficient to move at least some first color ink 69 upwards along assembly channel 42. Again, the time of pump activation may be computed from know pump rates or taken from a look-up table.

The steps illustrated by FIGS. 4*a* through 4*h* show one representative method in accordance with this invention for operating simplified color segment assembly unit 42*a* to provide a number (in this case four) of predetermined color segments 211 forming part of desired color pattern 205. It is to be appreciated that sequences of similar steps can be used to provide a larger portion or the entire portion of any patterns of predetermined color segments 211. It is also to be appreciated that while the sequence of steps described is adequate to provide the of predetermined color segments 211 shown in FIG. 4*a*, other sequences in which the ordering of some steps is altered can also provide the same predetermined color segment.

When a particular assembly channel of color segment assembly array 30 is operated so as to produce predetermined color segments, the segments so produced will generally exceed in length the distance from third color metering region 104 (FIG. 4*h*) to assembly channel top 46 and will be pumped into horizontally oriented color channels 38, as shown in FIG. 1*b*. In accordance with this invention, it is the purpose of the simplified color segment assembly units 40*a* to assemble predetermined color segments in assembly channels 42 in accordance with data provided by digital image source 26 and pump said color segments into color channels 38. In particular, when all assembly channels are operated, it is the purpose of simplified color segment assembly units 40*a* of color segment assembly array 30 (FIG. 1*b*) to provide a plurality of predetermined color segments 211 in assembly channels 42 and to pump the plurality of color segments 211 into the corresponding plurality of horizontally oriented color channels 38, thereby forming a two-dimensional array of predetermined color segments corresponding to the image in digital image source 26, as is well known in the art of image data processing.

There are at least two modes of operation of the colorant transfer printhead 10, a viewing mode and a printing mode. In the viewing mode a visible color image of the ink segments 211 is made to be observable from either the top or the bottom of colorant transfer printhead 10. In the printing mode, ink segments 211 in color channels 38 are transferred to receiver 230.

Figure 5A:
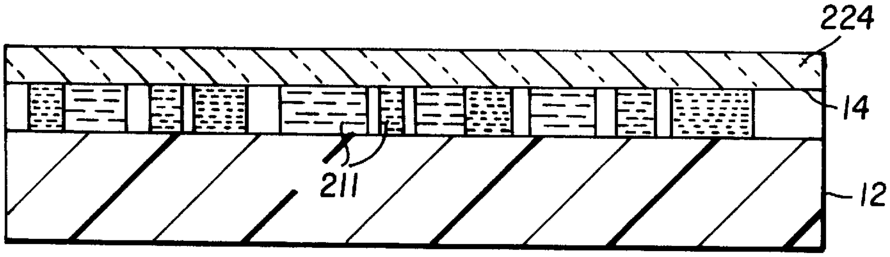
FIG. 5*a*–FIG. 5*c* show cross-sectional views of color segments which may be viewed as an image.
Figure 5B:
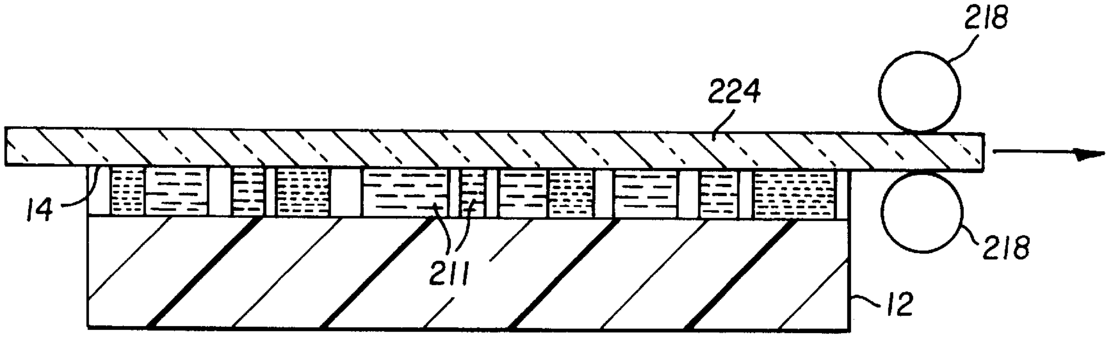
Figure 5C:
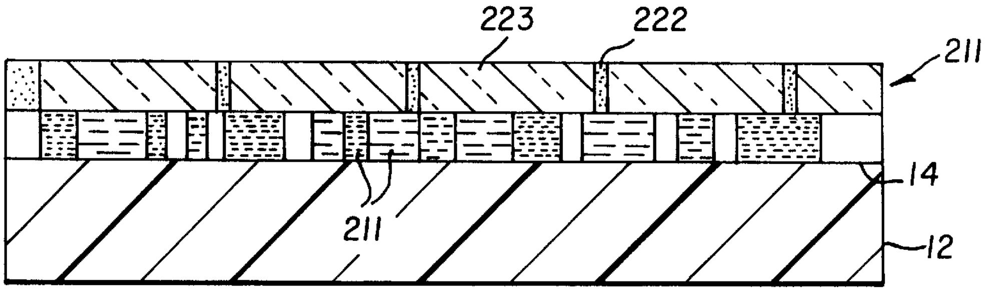

FIG. 5*a* depicts a cross-section along a color channel 38 of FIG. 1*b* showing a cross-section of one color channel 38, useful when the mode of operation of colorant transfer printhead 10 is the image viewing mode, in which a visible color image of the ink segments 211 is made to be observable from either the top or the bottom of colorant transfer printhead 10. A uniform transparent layer 224, such as glass, permanently covers substrate top surface 14. In another embodiment of the present invention useful in the image viewing mode and shown in FIG. 5*b*, uniform transparent layer 224 is moved along the top surface 14 of substrate 12 by rollers 218 preferably in the direction of flow of ink segments 211 in color channels 38 during the time ink segments 211 are pumped into color channels 38. In yet another embodiment of the present invention useful in the image viewing mode as shown in FIG. 5*c*, a partially transparent layer 221 permanently covers substrate top surface 14. Partially transparent layer 221 may consist of segments of a transparent material 223 separated by an opaque material 222. The embodiments shown in FIGS. 5*a–c* are useful for viewing the pattern of ink segments in color channels 230 but are not used for printing, due to the need for ink to be flowed to the overlying receiver 230 at a predetermined printing time.

Figure 6:
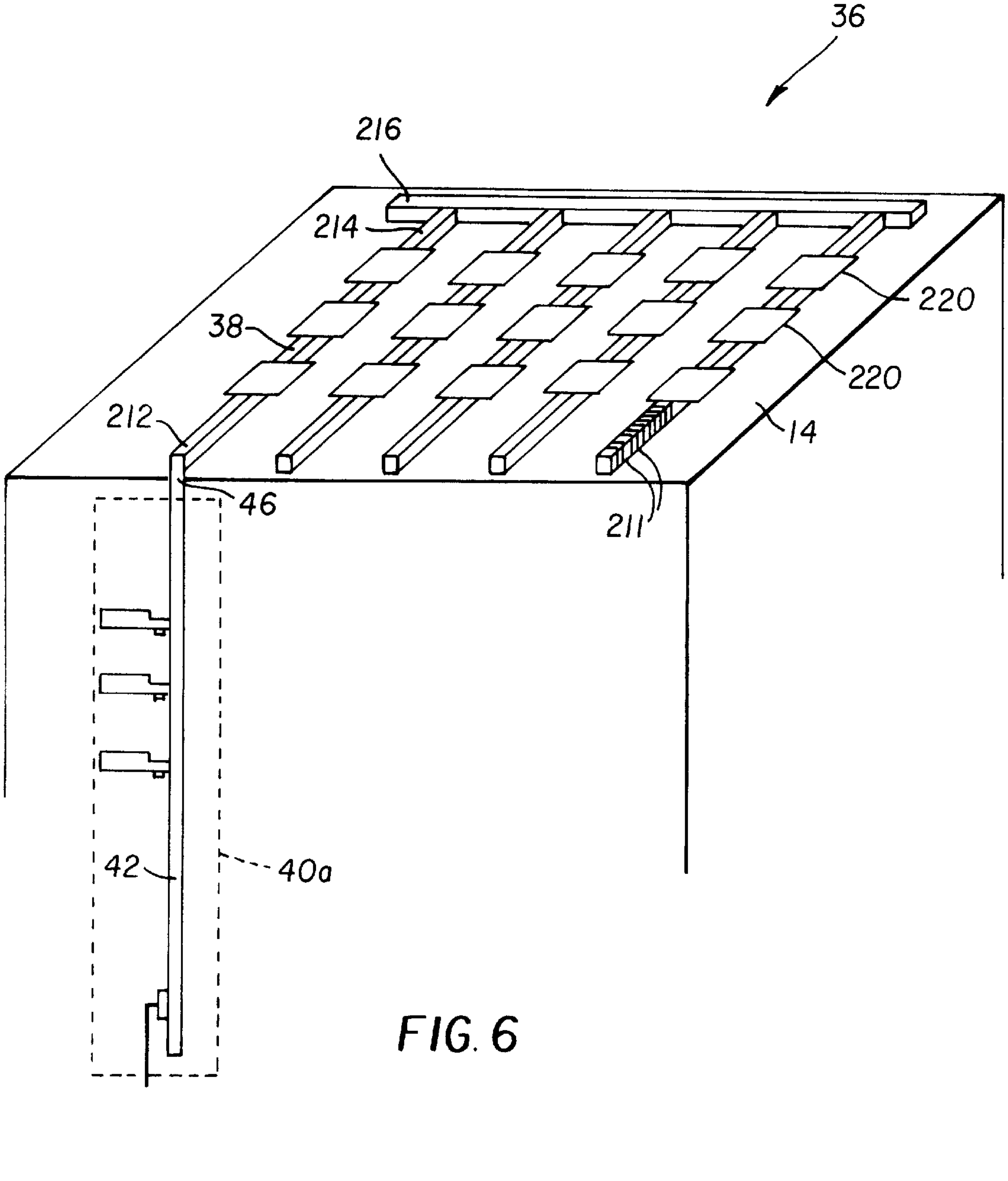
FIG. 6 is a schematic perspective of a color channel array with gates for printing color segments on a receiver.

A preferred embodiment of color channel array 36 useful in the image printing mode and shown in FIG. 6 consists of color channels 38 formed by etching rectangular grooves into substrate top surface 14, preferably by a reactive ion etch, each color channel having gates 220, shown in FIG. 6, corresponding to physical structures that are used to enable groupings or portions of ink segments 211, shown schematically in the right most color channel 38 of color channel array 36, to be transferred to a receiver 230 (FIG. 7*a*) overlying substrate top surface 14 when it is desired to print an image on receiver 230.

Gates 220 can be of many types, as will be described below, and in each case are characterized by their structure and functionality.

Gates 220 are preferably in the size range of from 10 to 1000 microns in order that a high quality color image can be rendered. Gates 220 serve in printing to enable the transfer of ink segments 211 from color channel array 36 to receiver 230 after a predetermined image transfer time and may therefore be regarded as devices which gather ink from a region including one or more ink segments 211 in one or more color channels 38 and cause such ink to be deposited on receiver 230 during the predetermined image transfer time.

Figure 7A:
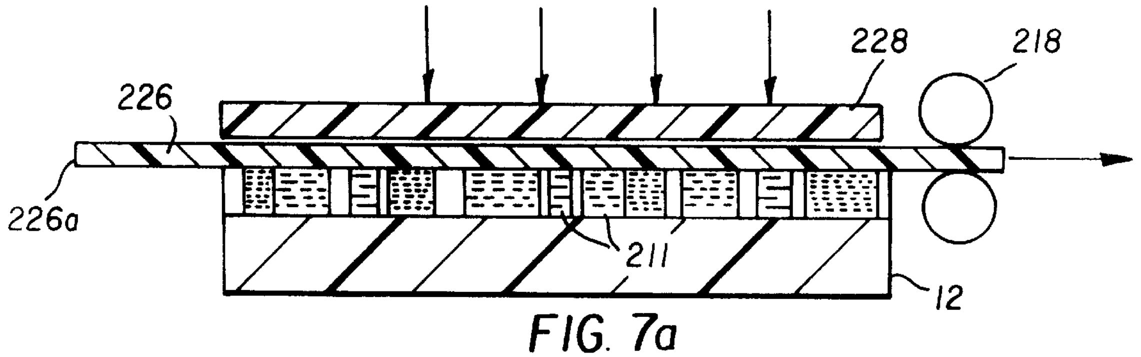
FIG. 7*a*–FIG. 7*c* respectively show a plan view and a cross-sectional view depicting the transfer of color segments to the receiver.
Figure 7B:
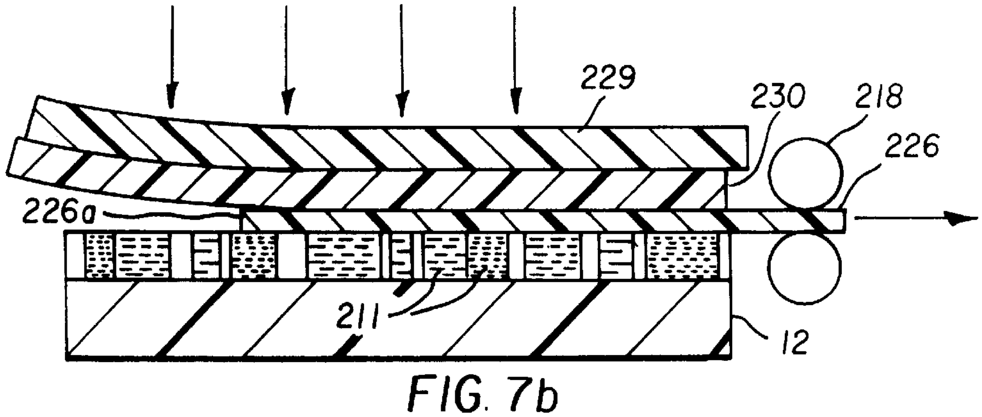
Figure 7C:
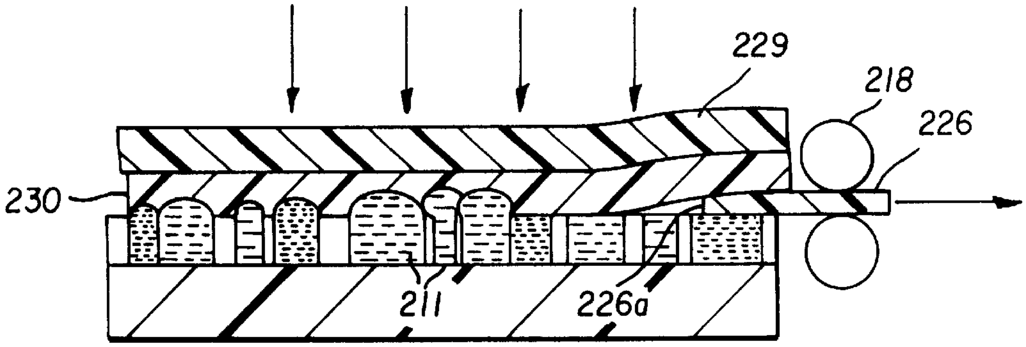

FIGS. 7*a–7c* depict cross-sections of FIG. 6 along a color channel showing a cross-section of one color channel 38 having ink segments 211 having a particularly simple type of pixel gate 220 useful when the mode of operation of colorant transfer printhead 10 is the printing mode, in which a visible color image of the ink segments 211 is transferred to receiver 230. The gates 220 according to this embodiment are provided by a thin membrane 226, which is held flat on substrate top surface 14 by pressure plate 228 during the time when ink segments 211 are pumped along color channels 38 and is then later removed so as to permit contact of receiver 230 and ink segments 211 as will be described. Alternatively thin membrane 226 can be moved along the top surface 14 of substrate 12 by rollers 218 preferably in the direction of flow of ink segments 211 in color channels 38 during the time ink segments 211 are pumped into color channels 38 to assist pumping. In this case thin membrane 226 is initially longer than color channel 38 so that membrane edge 226*a* does not move over color channels 38. Next, during printing, as shown in FIGS. 7*b* and 7*c*, receiver 230 is positioned directly above substrate top surface 14 by pressure plate 229 and is then pressed into contact with thin membrane 226. Printing is initiated by mechanically pulling thin membrane 226 by rollers 218 from one edge until the opposite edge, membrane edge 226*a* of thin membrane 226, is moved entirely along color channels 38 thereby permitting receiver 230 to be pressed into the top of the color channels 38 along their full length (FIG. 7*c*). Upon contacting the ink segments, inks comprising first, second, and third color inks 69, 89, and 109 respectively and carrier fluid 59 are imbibed into receiver 230. In this embodiment of the present invention, if thin membrane 226 is chosen to be a transparent material such as mylar or estar polymers, the color segments may be viewed prior to printing. Many materials including transparent materials may be used for thin membrane 226, as is well known in the art of polymer thin films.

Figure 8A:
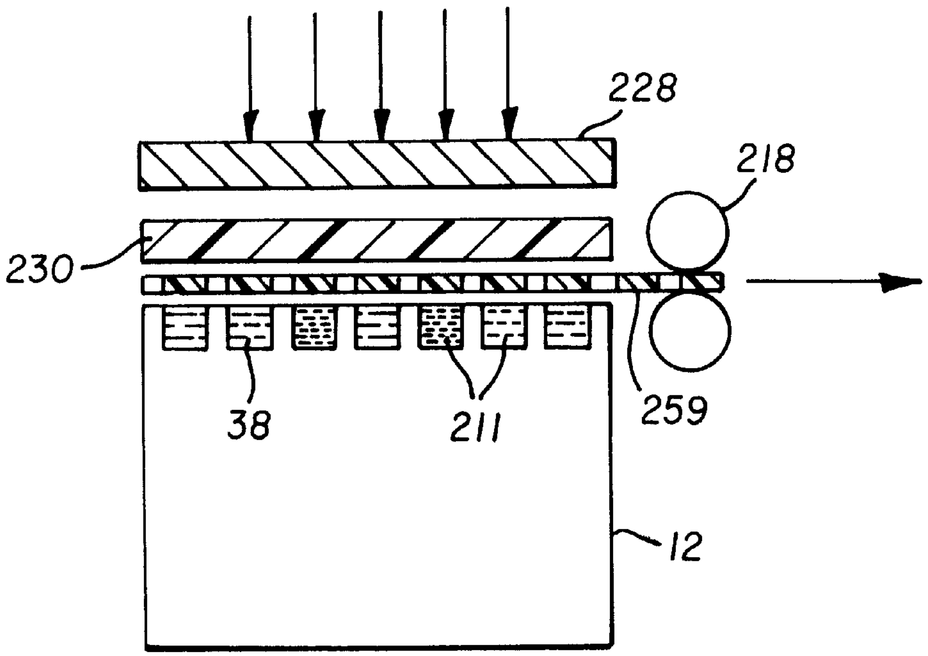
FIG. 8*a* through 8*j* respectively show plan views and cross-sectional views depicting alternative embodiments for the transfer of color segments to the receiver.
Figure 8B:
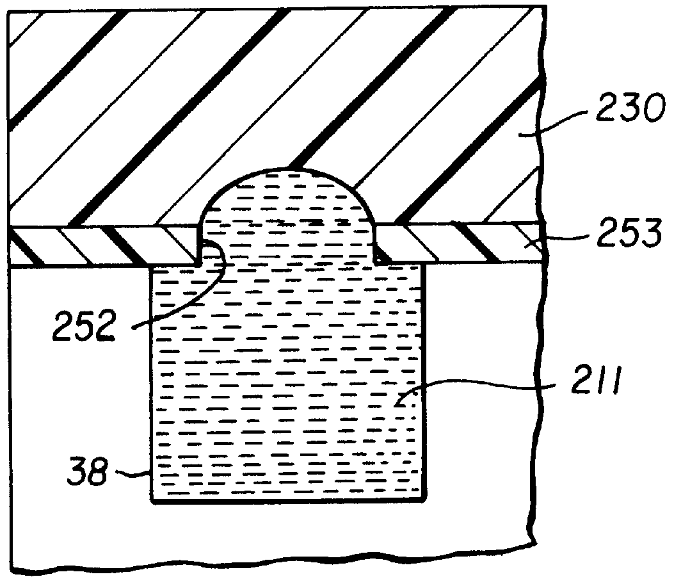

Printing may also be accomplished by alternative preferred embodiments of color channel array 36. FIG. 8*a* shows a second preferred embodiment for color channel array 36 useful for the printing of color images. The gates 220 in this case are of the form of a physical grating 259 comprising a sheet of material such as a thin plastic membrane 253 with openings 252 cut in a series of spaced lines such that openings 252 can be position either over the color channels 38 or in between the color channels 38. When ink segments 211 are pumped into color channels 38, the openings 252 are located between the color channels so no ink can flow to receiver 230. In this case, the physical grating 259 acts as a cover for the top of color channels 220. Receiver 230 is pressed onto physical grating 259 by pressure plate 228 with a moderate force so that physical grating 259 does not slip unintentionally but can be moved when printing is desired. When printing is desired, the openings 252 are moved so as to be located over color channels 230 by moving physical grating 259, for example by pulling physical grating 259 using rollers 218, so that the openings 252 lie over ink segments 211 (FIG. 8*b*), resulting in contact of the ink segments 211 with receiver 230, thereby resulting in wicking (FIG. 8*b*) of all or portions of ink segments 211 to the receiver in the vicinity of each opening 252, as is well known to occur in the art of fluid contact with receiver surfaces, such as paper fiber and polymer coated surfaces.

Figure 8C:
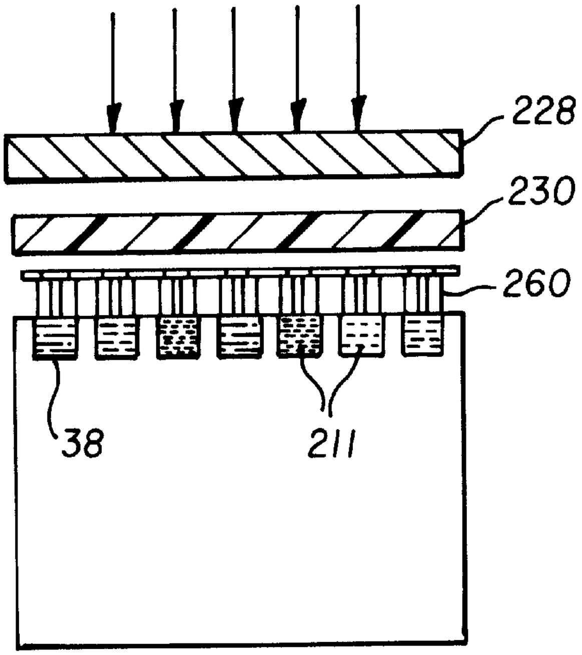
Figure 8D:
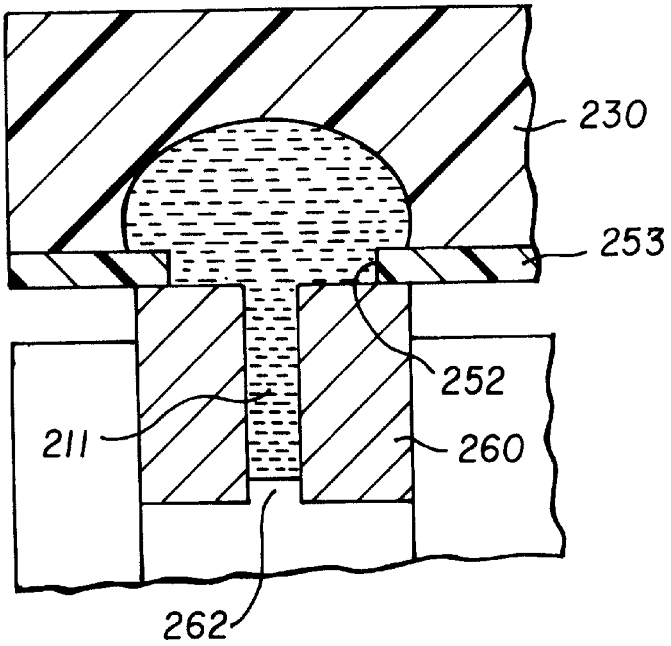

In a third preferred embodiment of color channel array 36 shown in FIGS. 8*c* and 8*d* useful for the printing of color images, the gates 220 are of the form of an array of pistons 260 having openings 262 in base portions 264 disposed over color channels 38 so that depressing pistons 260 forces ink segments 211 upwards into contact with receiver 230. Receiver 230 is pressed onto the array of pistons 260 by pressure plate 228 with a moderate force so that pistons 260 are not pressed into color channels 38 before printing is desired. When printing is desired, the pressure on pressure plate 228 is increased so that the pistons 260 are forced into ink channels 38 FIG. 8*d*), which cause inks comprising first, second, and third color inks 69, 89, and 109 respectively and carrier fluid 59 to be displaced upward through openings 262 into contact with receiver 230. When such contact occurs, wicking of all or of portions of ink segments 211 (FIG. 8*d*) causes printing on receiver 230 in the vicinity of each opening 262, as is well known to occur in the art of fluid contact with receiver surfaces.

Figure 8E:
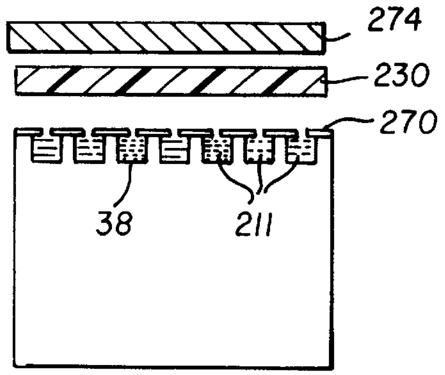
Figure 8F:
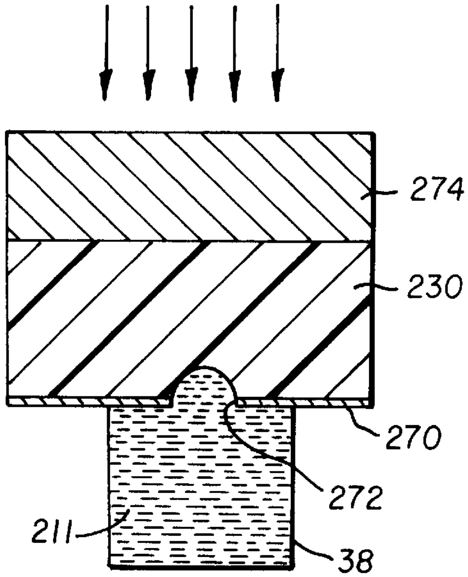
Figure 8G:
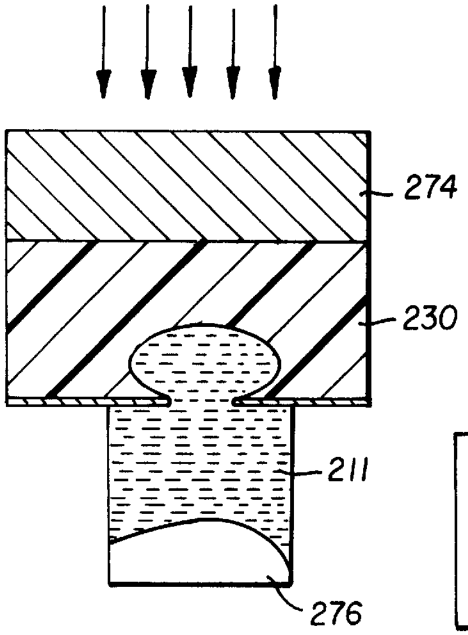
Figure 8H:
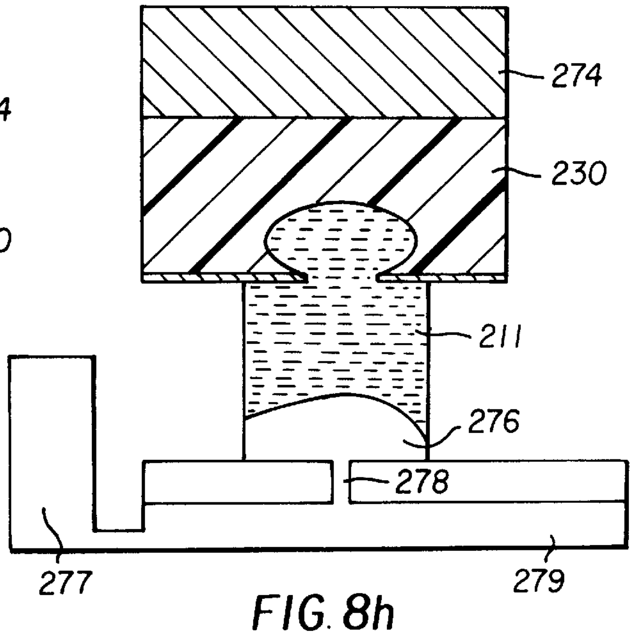

In a fourth preferred embodiment of color channel array 36 shown in FIGS. 8*e* through 8*h*, useful for the printing of color images, the gates 220 are of the form of a thin top layer 270 having openings 272 in disposed over color channels 38 so that the openings 272 lie over color channels 38. Before printing, receiver 230 is not in contact with the thin top layer 270, as shown in FIG. 8*e*. Despite the fact ink segments 211 contact openings 272, ink does not flow out openings 272 in the absence of contact with receiver 230, provided the openings are small, for example, less than 100 microns, due to the forces of surface tension, as is well known in the art of fluid mechanics (FIG. 8*e*). During printing, receiver 230 is brought into contact with thin top layer 270 and force sufficient to press receiver 230 into contact with ink segments is applied by means such as a deformable pressure plate 274 preferably made of a deformable material such as felt or rubber which is cable of bending sufficiently to press receiver 230 into contact with ink segments 211 in color channels 38, When such contact occurs, wicking of all or of portions of ink segments 211 (FIG. 8*f*) causes printing on receiver 230 in the vicinity of each opening 272, as is well known to occur in the art of fluid contact with receiver surfaces. As shown in FIG. 8*g*, an air space 274 forms with time as ink wicks into receiver 230. If desired, small air fill openings 278 (FIG. 8*h*) underlying color channels 38 and connected to air plenum 279 may be fabricated using thin film layer fabrication methods similar to those used to fabricate first color source layer 60 and assembly channels 42 in order to provide air directly to air spaces 274 and thus to increase the rate at which ink wicks into the receiver. Air plenum 279 may be open to the air or if desired may be connected to an air source 277 so as to provide a controlled air pressure or composition to air plenum 279. Ink does not flow out air fill openings 278 provided the openings are small, for example, less than 100 microns, due to the forces of surface tension, or if the air in air plenum 279 is pressurized.

Figure 8I:
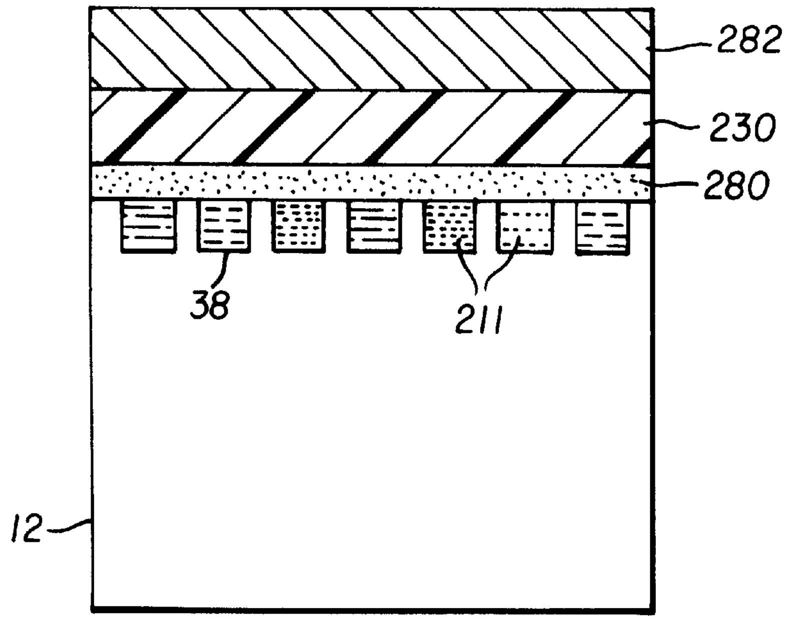
Figure 8J:
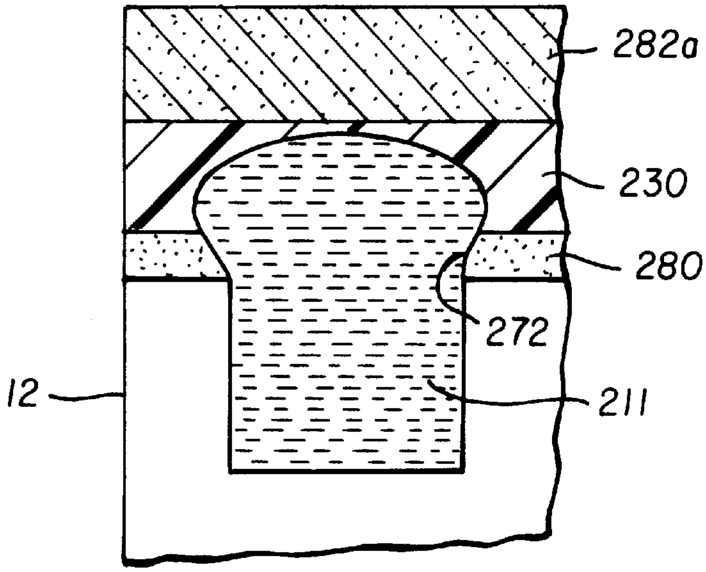

In a fifth preferred embodiment of color channel array 36 shown in FIGS. 8*i* and 8*j*, useful for the printing of color images, the gates 220 are of the form of a thermally activated layer 280 made of a material whose diffusion constant for the diffusion of liquids depends strongly on temperature uniformly disposed over color channels 38. Such materials can be made, for example, from polymers with low glass transition temperatures or may be in the form a very thin layer which dissolves at elevated temperatures such as a wax. Before printing, as shown in FIG. 8*i*, receiver 230 is in contact with thermally activated top layer 280 but the temperature of thermally activated layer 280 and ink segments 211 are low, for example room temperature, and ink segments 211 do not diffuse substantially to form a visible image on receiver 230. Receiver 230 and thermally activated layer 280 are held down by heatable pressure plate 282, shown at room temperature in FIG. 8*i*. During printing, the temperature of thermally activated layer 280 and ink segments is raised, for example to about 100 degrees C., by heating pressure plate 280, shown in FIG. 8*j* as heated pressure plate 282*a*. The temperature of heated pressure plate 282*a* is preferably less than the boiling point of ink segments 211. Under this condition of elevated temperature, shown in FIG. 8*j*, ink segments 211 move through thermally activated layer 280 to receiver 230 causing a visible image to print on receiver 230. Preferably, thermally activated layer 280 is made as a part of receiver 230 to save the difficulty of positioning two layers over the color channel array 36.

It is to be appreciated that although the current invention has been described in terms of specific preferred embodiments, there are many other embodiments which are possible and obvious to one skilled in the art that encompass equally the scope and spirit of the invention.

PARTS LIST

10 colorant transfer printhead
12 substrate
14 substrate top surface
20 fluid supply channels
21 fluid supply
22 electrical interconnects
23 controller
24 data processor
26 digital image source
28 receiver positioning device
30 color segment assembly array
36 color channel array
38 color channel
40*a* simplified color segment assembly unit
42 assembly channel
44 assembly channel bottom
46 assembly channel top
48 carrier fluid reservoir
57 carrier fluid pump
58 carrier fluid pump actuator
59 carrier fluid
60 first color source layer
61 first color reservoir layer
62 first color reservoir
63 first color external supply
64 first color metering region
66 first color capping layer
67 first color pump
69 first color ink
80 second color source layer
81 second color reservoir layer
82 second color reservoir
83 second color external supply
84 second color metering region
86 second color capping layer
87 second color pump
89 second color ink
100 third color source layer
101 third color reservoir layer
102 third color reservoir
103 third color external supply
104 third color metering region
106 third color capping layer
107 third color pump
109 third color ink
205 desired color pattern
211 ink color segment
211*a* first color segment
211*b* second color segment
211*c* third color segment
211*d* first color segment
211*e* first color segment
211*f* first color segment
211*g* second color segment
211*j* first color segment
211*k* second color segment
211*l* partial third color segment
211*m* third color segment
211*n* carrier fluid segment
211*o* third color segment
212 fluid input end
214 fluid outflow end
216 overflow channel
218 rollers
220 gates
221 partially transparent layer
222 opaque material
223 transparent material
224 uniform transparent layer
226 thin membrane
226 membrane edge
228 pressure plate
229 flexible pressure plate
230 receiver
259 physical grating
252 openings
253 thin plastic membrane
260 piston array
262 openings
264 base portions
270 thin top layer
272 openings
274 deformable pressure plate
276 air space
277 air source
278 air fill openings
279 air plenum
280 thermally activated layer
282 heatable pressure plate
282*a* heated pressure plate

What is claimed is:

1. A colorant transfer printhead for viewing or simultaneously delivering a plurality of color segments of ink having different colorants to a receiver, comprising:

(a) a plurality of spaced-apart color channels open on a top side, each such spaced-apart color channel being adapted to receive said plurality of color segments having different colorants, (b) means for delivering the color segments having different colorants of ink to each of the color channels; and (c) means for causing the delivered color segments in the color channels to be simultaneously transferred to the receiver including:

(i) a movable top element disposed over the color channels for preventing the transfer of the color segments from the top side of the color channels;

(ii) means for moving the top element to an unblocked position; and (iii) means for moving the receiver into engagement with the color channels so that the color segments are simultaneously imbibed into the receiver from the color channels.

2. The colorant transfer printhead according to claim 1 wherein the movable top element is a thin membrane.

3. The colorant transfer printhead according to claim 2 wherein the thin membrane is transparent to permit viewing of an image.

4. A colorant transfer printhead for viewing or simultaneously delivering a plurality of color segments of ink having different colorants to a receiver, comprising:

(a) a plurality of spaced-apart color channels, each such spaced-apart color channel being adapted to receive said plurality of color segments having different colorants;

(b) means for delivering the color segments having different colorants of ink to the color channels;

(c) means for causing the delivered color segments in the color channels to be simultaneously transferred to the receiver including:

(i) a movable top element having a plurality of openings movable between unblocked position for permitting color segment transfer to a blocking position for preventing the transfer of color segments from the color channels;

(ii) means for moving the top element to the unblocked position; and (iii) means for moving the receiver into engagement with the movable top element so that color segments are simultaneously imbibed into the receiver from the color channels.

5. The colorant transfer printhead of claim 4 wherein the movable top element is a thin plastic membrane formed with openings.

6. A colorant transfer printhead for viewing or simultaneously delivering a plurality of color segments of ink having different colorants to a receiver, comprising:

(a) a plurality of spaced-apart color channels, each such spaced-apart color channel being adapted to receive said plurality of color segments having different colorants, (b) means for delivering the color segments having different colorants of ink to the color channels; and (c) means for causing the delivered color segments in the color channels to be simultaneously transferred to a receiver including:

(i) a movable piston array associated with the color channels and movable into the color channels for causing color segments to contact to the receiver; and (ii) means for pressing the receiver against the movable piston array to cause such movable piston array to move into the color channels so that the color segments are simultaneously caused to contact the receiver.

7. A colorant transfer printhead for viewing or simultaneously delivering a plurality of color segments of ink having different colorants to a receiver, comprising:

(a) a plurality of spaced-apart color channels, each such spaced-apart color channel being adapted to receive said plurality of color segments having different colorants;

(b) means for delivering the color segments having different colorants of ink to the color channels; and (c) means for causing the delivered color segments in the color channels to be simultaneously transferred to the receiver including:

(i) a fixed top element having a plurality of openings aligned with the color channels and sized to prevent the transfer of the color segments until the receiver is placed on the fixed top element; and (ii) means for moving the receiver into engagement with the fixed top element so that the color segments are simultaneously imbibed into the receiver from the color channels through the openings in the fixed top element.

8. A colorant transfer printhead for viewing or simultaneously delivering a plurality of color segments of ink having different colorants to a receiver, comprising:

(a) a plurality of spaced-apart color channels, each such spaced-apart color channel being adapted to receive said plurality of color segments having different colorants;

(b) means for delivering the color segments having different colorants of ink to the color channels; and (c) means for causing the delivered color segments in the color channels to be simultaneously transferred to the receiver including:

(i) a fixed top element having a plurality of openings aligned with the color channels and sized to prevent the transfer of the color segments until the receiver is placed on the fixed top element;

(ii) means for introducing air into the color channels to cause pressure to be exerted upon the color segments; and (iii) means for moving the receiver into engagement with the fixed top element so that the introduced air facilitates the color segments being simultaneously imbibed into the receiver from the color channels through the openings in the fixed top element.

9. A colorant transfer printhead for viewing or simultaneously delivering a plurality of color segments of ink having different colorants to a receiver, comprising:

(a) a plurality of spaced-apart color channels open on a top side, each such spaced-apart color channel being adapted to receive said plurality of color segments having different colorants;

(b) means for delivering the color segments having different colorants of ink to the color channels; and (c) means for causing the delivered color segments in the color channels to be simultaneously transferred to the receiver including means for moving the receiver into engagement with the fixed top element so that the color segments are simultaneously imbibed into the receiver from the color channels through the openings in the fixed top element; and (d) means including a thermally activated layer which when heated permits the simultaneous transfer of the color segments from the top side of the color channels to the receiver.

10. The apparatus of claim 9 wherein the receiver includes the thermally activated layer.

11. The apparatus of claim 9 wherein the receiver includes the thermally activated layer and further including means for applying heat to the receiver which is transferred to the thermally active layer.

12. The apparatus of claim 11 wherein the thermally active layer melts when heated.

* * * * *